US009070193B2

(12) United States Patent
Malone et al.

(10) Patent No.: US 9,070,193 B2
(45) Date of Patent: *Jun. 30, 2015

(54) APPARATUS AND METHOD TO EMBED SEARCHABLE INFORMATION INTO A FILE, ENCRYPTION, TRANSMISSION, STORAGE AND RETRIEVAL

(71) Applicant: MYPORT TECHNOLOGIES, INC., McKinney, TX (US)

(72) Inventors: Michael F. Malone, McKinney, TX (US); Frederick J. Murphy, Falmouth, MA (US)

(73) Assignee: MYPORT TECHNOLOGIES, INC., McKinney, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/175,321

(22) Filed: Feb. 7, 2014

(65) Prior Publication Data

US 2014/0193028 A1    Jul. 10, 2014

Related U.S. Application Data

(63) Continuation of application No. 13/306,732, filed on Nov. 29, 2011, now Pat. No. 8,687,841, which is a continuation of application No. 12/857,731, filed on Aug. 17, 2010, now Pat. No. 8,068,638, which is a (Continued)

(51) Int. Cl.
*G06K 9/00* (2006.01)
*G06T 1/00* (2006.01)

(Continued)

(52) U.S. Cl.
CPC ............ *G06T 1/005* (2013.01); *H04N 1/32101* (2013.01); *H04N 1/32272* (2013.01);

(Continued)

(58) Field of Classification Search
USPC ........................... 382/100, 305; 713/155–186
See application file for complete search history.

(56) References Cited

U.S. PATENT DOCUMENTS

| 55,422 A | 6/1866 | Roustaei |
|---|---|---|
| 2,950,971 A | 8/1960 | Lewin |

(Continued)

FOREIGN PATENT DOCUMENTS

| EP | 0905966 A2 | 3/1999 |
|---|---|---|
| EP | 1204277 A2 | 5/2002 |

(Continued)

OTHER PUBLICATIONS

Franks, et al., "HTTP Authentication: Basic and Digest Access Authentication," The Internet Society, Jun. 1999.

(Continued)

*Primary Examiner* — Ishrat I Sherali
(74) *Attorney, Agent, or Firm* — Howison & Arnott, L.L.P.

(57) ABSTRACT

A cell phone is disclosed for acquiring information to be transmitted to a receiving facility and for transmitting such thereto. A capture device captures information from an external source. A stamping device is provided for associating with the captured information a representation of the date and time of the capture of the information, such that the representation of the date and time information in association with the captured information forms augmented captured information. A data processing unit places the augmented captured information in association with subscriber information in a transmission of the augmented captured information to a receiving facility requiring such subscriber information. A transmitter transmits the transmission including the augmented captured information and the subscriber information to the receiving facility. The data processing unit encrypts the augmented captured information with a symmetrical encryption algorithm to provide encrypted augmented captured information in the transmission with the subscriber information.

31 Claims, 8 Drawing Sheets

Related U.S. Application Data continuation of application No. 11/679,533, filed on Feb. 27, 2007, now Pat. No. 7,778,440, which is a continuation of application No. 11/325,373, filed on Jan. 4, 2006, now Pat. No. 7,184,573, which is a continuation of application No. 10/674,910, filed on Sep. 29, 2003, now Pat. No. 6,996,251.

(60) Provisional application No. 60/414,449, filed on Sep. 30, 2002.

(51) Int. Cl.
  *H04N 1/32* (2006.01)
  *H04L 9/32* (2006.01)
  *H04L 9/08* (2006.01)

(52) U.S. Cl.
  CPC .... *H04N1/32277* (2013.01); *H04N 2201/3205* (2013.01); *H04N 2201/3214* (2013.01); *H04N 2201/3215* (2013.01); *H04N 2201/3233* (2013.01); *H04N 2201/3235* (2013.01); *H04N 2201/3253* (2013.01); *H04N 2201/3274* (2013.01); *H04N 2201/3281* (2013.01); *H04N 2201/3283* (2013.01); *H04L 9/3263* (2013.01); *H04L 2209/60* (2013.01); *H04L 2209/80* (2013.01); *H04L 9/3218* (2013.01); *H04L 9/08* (2013.01)

(56) References Cited

U.S. PATENT DOCUMENTS

| | | |
|---|---|---|
| 3,439,598 A | 4/1969 | Weitzner et al. |
| 4,015,240 A | 3/1977 | Swonger et al. |
| 4,109,237 A | 8/1978 | Hill |
| 4,115,805 A | 9/1978 | Morton |
| 4,270,853 A | 6/1981 | Hatada et al. |
| 4,270,854 A | 6/1981 | Stemme et al. |
| 4,334,241 A | 6/1982 | Kashioka et al. |
| 4,344,682 A | 8/1982 | Hattori |
| 4,389,109 A | 6/1983 | Taniguchi et al. |
| 4,443,077 A | 4/1984 | Tanikawa |
| 4,528,588 A | 7/1985 | Lofberg |
| 4,574,319 A | 3/1986 | Konishi |
| 4,613,911 A | 9/1986 | Ohta |
| 4,620,318 A | 10/1986 | Hill |
| 4,642,717 A | 2/1987 | Matsuda et al. |
| 4,742,369 A | 5/1988 | Ishii et al. |
| 4,905,029 A | 2/1990 | Kelley |
| 4,951,079 A | 8/1990 | Hoshino et al. |
| 4,965,626 A | 10/1990 | Robison et al. |
| 4,977,419 A | 12/1990 | Wash et al. |
| 4,983,996 A | 1/1991 | Kinoshita |
| 4,994,831 A | 2/1991 | Marandi |
| 4,995,086 A | 2/1991 | Lilley et al. |
| 5,023,635 A | 6/1991 | Nealon |
| 5,025,283 A | 6/1991 | Robinson |
| 5,027,149 A | 6/1991 | Hoshino et al. |
| 5,031,122 A | 7/1991 | Witty |
| 5,070,355 A | 12/1991 | Inoue et al. |
| 5,097,278 A | 3/1992 | Tamamura et al. |
| 5,099,262 A | 3/1992 | Tanaka et al. |
| 5,103,486 A | 4/1992 | Grippi |
| 5,128,700 A | 7/1992 | Inoue et al. |
| 5,142,310 A | 8/1992 | Taniguchi et al. |
| 5,146,249 A | 9/1992 | Hoda et al. |
| 5,160,952 A | 11/1992 | Iwashita et al. |
| 5,245,372 A | 9/1993 | Aoshima |
| 5,247,300 A | 9/1993 | Sohn |
| 5,267,042 A | 11/1993 | Tsuchiya et al. |
| 5,276,472 A | 1/1994 | Bell et al. |
| 5,313,235 A | 5/1994 | Inoue et al. |
| 5,335,072 A | 8/1994 | Tanaka et al. |
| 5,410,598 A | 4/1995 | Shear |
| 5,426,745 A | 6/1995 | Baji et al. |
| 5,493,677 A | 2/1996 | Balogh et al. |
| 5,499,294 A | 3/1996 | Friedman |
| 5,502,576 A | 3/1996 | Ramsay et al. |
| 5,506,644 A | 4/1996 | Suzuki et al. |
| 5,515,042 A | 5/1996 | Nelson |
| 5,519,778 A | 5/1996 | Leighton et al. |
| 5,530,759 A | 6/1996 | Braudaway et al. |
| 5,546,145 A | 8/1996 | Bernardi et al. |
| 5,568,570 A | 10/1996 | Rabbani |
| 5,581,800 A | 12/1996 | Fardeau et al. |
| 5,602,458 A | 2/1997 | Dowe |
| 5,617,119 A | 4/1997 | Briggs et al. |
| 5,629,980 A | 5/1997 | Stefik |
| 5,633,678 A | 5/1997 | Parulski et al. |
| 5,642,285 A | 6/1997 | Woo et al. |
| 5,646,990 A | 7/1997 | Li |
| 5,646,997 A | 7/1997 | Barton |
| 5,657,077 A | 8/1997 | DeAngelis et al. |
| 5,682,458 A | 10/1997 | Funazaki |
| 5,692,104 A | 11/1997 | Chow et al. |
| 5,692,225 A | 11/1997 | Bernardi et al. |
| 5,706,457 A | 1/1998 | Dwyer et al. |
| 5,712,679 A | 1/1998 | Coles |
| 5,726,660 A | 3/1998 | Purdy et al. |
| 5,732,354 A | 3/1998 | MacDonald |
| 5,737,491 A | 4/1998 | Allen et al. |
| 5,740,244 A | 4/1998 | Indeck et al. |
| 5,765,152 A | 6/1998 | Erickson |
| 5,767,496 A | 6/1998 | Swartz et al. |
| 5,768,640 A | 6/1998 | Takahashi et al. |
| 5,786,851 A | 7/1998 | Kondo et al. |
| 5,787,186 A | 7/1998 | Schroeder |
| 5,796,428 A | 8/1998 | Matsumoto et al. |
| 5,799,092 A | 8/1998 | Kristol et al. |
| 5,806,005 A | 9/1998 | Hull et al. |
| 5,815,201 A | 9/1998 | Hashimoto et al. |
| 5,819,289 A | 10/1998 | Sanford, II et al. |
| 5,822,432 A | 10/1998 | Moskowitz et al. |
| 5,825,890 A | 10/1998 | Elgamal et al. |
| 5,828,809 A | 10/1998 | Chang et al. |
| 5,835,667 A | 11/1998 | Wactlar et al. |
| 5,841,886 A | 11/1998 | Rhoads |
| 5,841,978 A | 11/1998 | Rhoads |
| 5,845,281 A | 12/1998 | Benson et al. |
| 5,857,038 A | 1/1999 | Owada et al. |
| 5,862,260 A | 1/1999 | Rhoads |
| 5,872,865 A | 2/1999 | Normile et al. |
| 5,889,578 A | 3/1999 | Jamzadeh |
| 5,892,900 A | 4/1999 | Ginter et al. |
| 5,893,095 A | 4/1999 | Jain et al. |
| 5,907,149 A | 5/1999 | Marckini |
| 5,913,078 A | 6/1999 | Kimura et al. |
| 5,923,327 A | 7/1999 | Smith et al. |
| 5,940,121 A | 8/1999 | McIntyre et al. |
| 5,943,422 A | 8/1999 | Van Wie et al. |
| 5,978,773 A | 11/1999 | Hudetz et al. |
| 5,991,876 A | 11/1999 | Johnson et al. |
| 5,995,630 A | 11/1999 | Borza |
| 5,995,936 A | 11/1999 | Brais et al. |
| 6,005,936 A | 12/1999 | Shimizu et al. |
| 6,014,183 A | 1/2000 | Hoang |
| 6,014,569 A | 1/2000 | Bottum |
| 6,023,241 A | 2/2000 | Clapper |
| 6,031,526 A | 2/2000 | Shipp |
| 6,064,764 A | 5/2000 | Bhaskaran et al. |
| 6,065,119 A | 5/2000 | Sandford, II et al. |
| 6,104,430 A | 8/2000 | Fukuoka |
| 6,111,605 A | 8/2000 | Suzuki |
| 6,115,137 A | 9/2000 | Ozawa et al. |
| 6,115,717 A | 9/2000 | Mehrotra et al. |
| 6,122,403 A | 9/2000 | Rhoads |
| 6,141,753 A | 10/2000 | Zhao et al. |
| 6,148,091 A | 11/2000 | DiMaria |
| 6,160,964 A | 12/2000 | Imoto |
| 6,166,729 A | 12/2000 | Acosta et al. |
| 6,181,373 B1 | 1/2001 | Coles |
| 6,185,316 B1 | 2/2001 | Buffam |
| 6,185,683 B1 | 2/2001 | Ginter et al. |

(56) References Cited

U.S. PATENT DOCUMENTS

| | | |
|---|---|---|
| 6,198,989 B1 | 3/2001 | Tankhilevich et al. |
| 6,205,249 B1 | 3/2001 | Moskowitz |
| 6,208,746 B1 | 3/2001 | Musgrave |
| 6,212,401 B1 | 4/2001 | Ackley |
| 6,219,560 B1 | 4/2001 | Erkkila |
| 6,222,985 B1 | 4/2001 | Miyake |
| 6,233,684 B1 | 5/2001 | Stefik et al. |
| 6,243,480 B1 | 6/2001 | Zhao et al. |
| 6,243,481 B1 | 6/2001 | Tao |
| 6,269,446 B1 | 7/2001 | Schumacher et al. |
| 6,282,362 B1 | 8/2001 | Murphy et al. |
| 6,282,654 B1 | 8/2001 | Ikeda et al. |
| 6,292,092 B1 | 9/2001 | Chow et al. |
| 6,292,633 B1 | 9/2001 | Nakagawa |
| 6,300,880 B1 | 10/2001 | Sitnik |
| 6,301,368 B1 | 10/2001 | Bolle et al. |
| 6,321,981 B1 | 11/2001 | Ray et al. |
| 6,332,193 B1 | 12/2001 | Glass et al. |
| 6,334,187 B1 | 12/2001 | Kadono |
| 6,359,837 B1 | 3/2002 | Tsukamoto |
| 6,363,043 B1 | 3/2002 | Kondo |
| 6,366,680 B1 | 4/2002 | Brunk et al. |
| 6,377,699 B1 | 4/2002 | Musgrave et al. |
| 6,389,151 B1 | 5/2002 | Carr et al. |
| 6,389,538 B1 | 5/2002 | Gruse et al. |
| 6,397,334 B1 | 5/2002 | Chainer et al. |
| 6,411,328 B1 | 6/2002 | Franke et al. |
| 6,421,450 B2 | 7/2002 | Nakano |
| 6,424,968 B1 | 7/2002 | Broster et al. |
| 6,437,933 B1 | 8/2002 | Sugiyama et al. |
| 6,449,367 B2 | 9/2002 | Van Wie et al. |
| 6,462,778 B1 | 10/2002 | Abram et al. |
| 6,469,969 B2 | 10/2002 | Carson et al. |
| 6,491,217 B2 | 12/2002 | Catan |
| 6,498,586 B2 | 12/2002 | Pankinaho |
| 6,505,160 B1 | 1/2003 | Levy et al. |
| 6,507,371 B1 | 1/2003 | Hashimoto et al. |
| 6,525,768 B2 | 2/2003 | Obradovich |
| 6,526,215 B2 | 2/2003 | Hirai et al. |
| 6,526,351 B2 | 2/2003 | Whitham |
| 6,532,298 B1 | 3/2003 | Cambier et al. |
| 6,535,298 B2 | 3/2003 | Winter et al. |
| 6,560,339 B1 | 5/2003 | Iwamura |
| 6,560,660 B1 | 5/2003 | Flanagin |
| 6,571,271 B1 | 5/2003 | Savitzky et al. |
| 6,577,336 B2 | 6/2003 | Safai |
| 6,591,365 B1 | 7/2003 | Cookson |
| 6,606,117 B1 | 8/2003 | Windle |
| 6,611,607 B1 | 8/2003 | Davis et al. |
| 6,628,325 B1 | 9/2003 | Steinberg et al. |
| 6,636,158 B1 | 10/2003 | Bando et al. |
| 6,636,249 B1 | 10/2003 | Rekimoto |
| 6,670,984 B1 | 12/2003 | Tanaka et al. |
| 6,681,029 B1 | 1/2004 | Rhoads |
| 6,683,649 B1 | 1/2004 | Anderson |
| 6,687,383 B1 | 2/2004 | Kanevsky et al. |
| 6,714,778 B2 | 3/2004 | Nykanen et al. |
| 6,720,879 B2 | 4/2004 | Edwards |
| 6,741,864 B2 | 5/2004 | Wilcock et al. |
| 6,747,692 B2 | 6/2004 | Patel et al. |
| 6,750,902 B1 | 6/2004 | Steinberg et al. |
| 6,786,397 B2 | 9/2004 | Silverbrook et al. |
| 6,788,800 B1 | 9/2004 | Carr et al. |
| 6,807,534 B1 | 10/2004 | Erickson |
| 6,831,682 B1 | 12/2004 | Silverbrook et al. |
| 6,833,861 B2 | 12/2004 | Matsumoto et al. |
| 6,853,987 B1 | 2/2005 | Cook |
| 6,856,344 B2 | 2/2005 | Franz |
| 6,889,324 B1 | 5/2005 | Kanai et al. |
| 6,895,126 B2 | 5/2005 | Di Bernardo et al. |
| 6,914,695 B2 | 7/2005 | Walters et al. |
| 6,947,571 B1 | 9/2005 | Rhoads et al. |
| 6,952,164 B2 | 10/2005 | Junqua |
| 6,956,671 B2 | 10/2005 | Monty et al. |
| 6,959,868 B2 | 11/2005 | Tsikos et al. |
| 6,965,324 B1 | 11/2005 | Suggs, Sr. |
| 6,968,366 B1 | 11/2005 | Zhang et al. |
| 6,968,453 B2 * | 11/2005 | Doyle et al. .................. 713/168 |
| 6,990,444 B2 | 1/2006 | Hind et al. |
| 6,996,251 B2 * | 2/2006 | Malone et al. ................ 382/100 |
| 7,010,144 B1 | 3/2006 | Davis et al. |
| 7,016,899 B1 | 3/2006 | Stern et al. |
| 7,043,048 B1 | 5/2006 | Ellingson |
| 7,053,938 B1 | 5/2006 | Sherry |
| 7,095,871 B2 | 8/2006 | Jones et al. |
| 7,184,573 B2 | 2/2007 | Malone et al. |
| RE39,526 E | 3/2007 | Hull et al. |
| 7,265,779 B2 | 9/2007 | Sato et al. |
| 7,319,484 B2 | 1/2008 | Yoshida et al. |
| 7,324,943 B2 | 1/2008 | Rigazio et al. |
| 7,391,960 B2 | 6/2008 | Shinozaki et al. |
| 7,617,542 B2 | 11/2009 | Vataja |
| 7,778,438 B2 | 8/2010 | Malone |
| 7,778,440 B2 | 8/2010 | Malone |
| 7,831,598 B2 | 11/2010 | Ko |
| 7,907,199 B2 | 3/2011 | Seki et al. |
| 7,961,218 B2 | 6/2011 | Seki et al. |
| 8,068,638 B2 | 11/2011 | Malone |
| 8,099,772 B2 * | 1/2012 | Takada et al. .................. 726/10 |
| 8,135,169 B2 | 3/2012 | Malone |
| 8,428,227 B2 * | 4/2013 | Angel et al. .................... 379/68 |
| 2001/0007130 A1 | 7/2001 | Takaragi |
| 2001/0011680 A1 | 8/2001 | Soltesz et al. |
| 2001/0012062 A1 | 8/2001 | Anderson |
| 2001/0012066 A1 | 8/2001 | Parulski et al. |
| 2001/0015759 A1 | 8/2001 | Squibbs |
| 2001/0018349 A1 | 8/2001 | Kinnunen et al. |
| 2001/0021144 A1 | 9/2001 | Oshima et al. |
| 2001/0021978 A1 | 9/2001 | Okayasu et al. |
| 2001/0025342 A1 | 9/2001 | Uchida |
| 2001/0034835 A1 | 10/2001 | Smith |
| 2001/0044824 A1 | 11/2001 | Hunter et al. |
| 2002/0001395 A1 | 1/2002 | Davis et al. |
| 2002/0010684 A1 | 1/2002 | Moskowitz |
| 2002/0015042 A1 | 2/2002 | Robotham et al. |
| 2002/0030907 A1 | 3/2002 | Ikeda et al. |
| 2002/0031240 A1 | 3/2002 | Levy et al. |
| 2002/0032502 A1 | 3/2002 | Russell |
| 2002/0033844 A1 | 3/2002 | Levy et al. |
| 2002/0046188 A1 | 4/2002 | Burges et al. |
| 2002/0051577 A1 | 5/2002 | Kinjo |
| 2002/0059162 A1 | 5/2002 | Shinoda et al. |
| 2002/0061120 A1 | 5/2002 | Carr et al. |
| 2002/0062382 A1 | 5/2002 | Rhoads et al. |
| 2002/0072935 A1 | 6/2002 | Rowse et al. |
| 2002/0073056 A1 | 6/2002 | Broster et al. |
| 2002/0075298 A1 | 6/2002 | Schena et al. |
| 2002/0080271 A1 | 6/2002 | Eveleens et al. |
| 2002/0080396 A1 | 6/2002 | Silverbrook et al. |
| 2002/0080964 A1 | 6/2002 | Stone et al. |
| 2002/0083123 A1 | 6/2002 | Freedman et al. |
| 2002/0102966 A1 | 8/2002 | Lev et al. |
| 2002/0146148 A1 | 10/2002 | Levy |
| 2002/0152388 A1 | 10/2002 | Linnartz et al. |
| 2002/0191087 A1 | 12/2002 | Hashimoto et al. |
| 2002/0194480 A1 | 12/2002 | Nagao |
| 2003/0011684 A1 | 1/2003 | Narayanaswami et al. |
| 2003/0032033 A1 | 2/2003 | Anglin et al. |
| 2003/0048921 A1 | 3/2003 | Cahill |
| 2003/0177094 A1 | 9/2003 | Needham et al. |
| 2003/0187950 A1 | 10/2003 | Rising, III |
| 2004/0005078 A1 | 1/2004 | Tillotson |
| 2004/0022444 A1 | 2/2004 | Rhoads |
| 2004/0023686 A1 | 2/2004 | King et al. |
| 2004/0032499 A1 | 2/2004 | Silverbrook et al. |
| 2004/0039930 A1 | 2/2004 | Ohmori et al. |
| 2004/0044911 A1 | 3/2004 | Takada et al. |
| 2004/0049734 A1 | 3/2004 | Simske |
| 2004/0053637 A1 | 3/2004 | Iida |
| 2004/0068371 A1 | 4/2004 | Estep |
| 2004/0070670 A1 | 4/2004 | Foster |
| 2004/0073557 A1 | 4/2004 | Piccionelli et al. |
| 2004/0073568 A1 | 4/2004 | Yonaha |
| 2004/0085203 A1 | 5/2004 | Junqua |

(56) References Cited

U.S. PATENT DOCUMENTS

| | | |
|---|---|---|
| 2004/0091111 A1 | 5/2004 | Levy et al. |
| 2004/0101138 A1 | 5/2004 | Revital et al. |
| 2004/0103283 A1 | 5/2004 | Hornak |
| 2004/0109199 A1 | 6/2004 | Tsubaki |
| 2004/0114042 A1 | 6/2004 | Paolini et al. |
| 2004/0148518 A1 | 7/2004 | Grundback et al. |
| 2004/0183915 A1 | 9/2004 | Gotohda et al. |
| 2004/0197013 A1 | 10/2004 | Kamei |
| 2004/0203386 A1 | 10/2004 | Tischler et al. |
| 2004/0257431 A1 | 12/2004 | Girish et al. |
| 2005/0024493 A1 | 2/2005 | Nam |
| 2005/0041035 A1 | 2/2005 | Nagatomo et al. |
| 2005/0043018 A1 | 2/2005 | Kawamoto |
| 2005/0091311 A1 | 4/2005 | Lund et al. |
| 2005/0094000 A1 | 5/2005 | Son et al. |
| 2005/0134703 A1 | 6/2005 | Mittal |
| 2005/0143136 A1 | 6/2005 | Lev et al. |
| 2005/0185049 A1 | 8/2005 | Iwai et al. |
| 2005/0216580 A1 | 9/2005 | Raji et al. |
| 2005/0216949 A1 | 9/2005 | Candelora et al. |
| 2005/0219359 A1 | 10/2005 | Trela |
| 2005/0231752 A1 | 10/2005 | Sainio |
| 2006/0018506 A1 | 1/2006 | Rodriguez et al. |
| 2007/0055689 A1 | 3/2007 | Rhoads et al. |
| 2007/0098172 A1 | 5/2007 | Levy et al. |
| 2007/0250526 A1 | 10/2007 | Hanna |

FOREIGN PATENT DOCUMENTS

| | | |
|---|---|---|
| WO | 9603286 A1 | 2/1996 |
| WO | 9626494 A1 | 8/1996 |
| WO | 9743736 A1 | 11/1997 |
| WO | 9827510 A1 | 6/1998 |
| WO | 9901859 | 1/1999 |
| WO | 9936876 A2 | 7/1999 |
| WO | 0036605 A1 | 6/2000 |
| WO | 0070585 A1 | 11/2000 |
| WO | 0115021 A2 | 3/2001 |
| WO | 0152178 A1 | 7/2001 |
| WO | 0161508 A1 | 8/2001 |
| WO | 0167707 | 9/2001 |
| WO | 0173586 A2 | 10/2001 |
| WO | 0175629 A1 | 10/2001 |
| WO | 0197128 A1 | 12/2001 |
| WO | 0211446 A2 | 2/2002 |

OTHER PUBLICATIONS

Franks, et al., "An Extension to HTTP: Digest Access Authentication," The Internet Society, Jan. 1997.

Stansell, Jr., "Civil GPS from a Future Perspective," Proceedings of the IEEE, Oct. 1983, vol. 71, No. 10; pp. 1187-1192.

Dale, Diana & Rog, Ron, The Need for a Meta-Tag Standard for Audio and Visual Materials, Proc. Int. Conf. on Dublin Core and Metadata for e-Communities 2002: 205-206.

Kosovic, Douglas; Schroeter, Ronald; and Hunter, Jane, Collaborative Video Annotation, Indexing and Discussion over high-bandwidth networks, DSTC Technical Report TR247, 2002, DSTC Pty Ltd., St Lucia, Old, Australia.

Supplemental First Amended Complaint, *MyPort IP, Inc.* v. *HTC Corporation*, Civil Action No. 6:11-cv-00246 (F.D. Tex. Filed Mar. 8, 2012) ("MyPort Complaint"), 12 pages.

Digital Still Camera Image File Format Standard (Exchangeable image file format for Digital Still Cameras: Exit), Version 2.1, published Jun. 12, 1998 by the Japan Electronic Industry Development Association (JEIDA) ("Exif 2.1 Specification"), 173 pages.

TIFF Specification Revision 6.0, Aldus Developers Desk, Aldus Corporation, Jun. 3, 1992.

James Bao-Yen Tsui, Fundamental of Global Positioning System Receivers: A Software Approach, pp. 1-6, 73-108, 193-217 (John Wiley & Sons, Inc. 2000).

PPP Encryption Control Protocol, Internet Engineering Task Force (IETF), published Jun. 1996.

Alfred Menezes, Paul C. van Oorschot, and Scott A. Vanstone, Handbook of Applied Cryptography (CRC Press 1996).

MyPort IP, Inc.'s Disclosure Pursuant to Patent Rule 3-1, *MyPort IP, Inc.* v. *HTC Corporation*, Civil Action No. 6:11-cv-00246 (E.D. Tex. Filed May 13, 2011).

United States Patent and Trademark Office; Office Action in related re-exam application 95/001,957; dated May 18, 2012; 36 pages.

Response to Inter Partes Re-Exam Office Action in related re-exam application 95/001,957; dated Aug. 20, 2012; Attorney Gregory M. Howison; 122 pages.

Corrected Response to Inter Partes Re-Exam Office Action in related re-exam application 95/001,957; dated Sep. 24, 2012; Attorney Gregory M. Howison; 40 pages.

United States Patent and Trademark Office; Office Action in related re-exam application 95/002,056; dated Sep. 17, 2012; 41 pages.

Response to Inter Partes Re-Exam Office Action in related re-exam application 95/002,056; dated Dec. 17, 2012; Attorney Gregory M. Howison; 123 pages.

H. Krawczyk, RFC 2104 (RFC2104) RFC 2104—HMAC: Keyed-Flashing for Message Authentication https://www.faqs.org/rfcs/rfc2104.htm, Feb. 1997.

G. Friedman, "The Trustworthy Digital Camera: Restoring Credibility to the Photographic Image," IEEE Transactions on Consumer Electronics, pp. 905-910, vol. 39, No. 4, Nov. 1993.

United States Patent and Trademark Office; Request for Ex Parte Reexamination in related re-exam application 90/013,265; dated Jun. 6, 2014; 1085 pages.

United States Patent and Trademark Office; Request for Ex Parte Reexamination in related re-exam application 90/013,255; dated May 27, 2014; 906 pages.

* cited by examiner

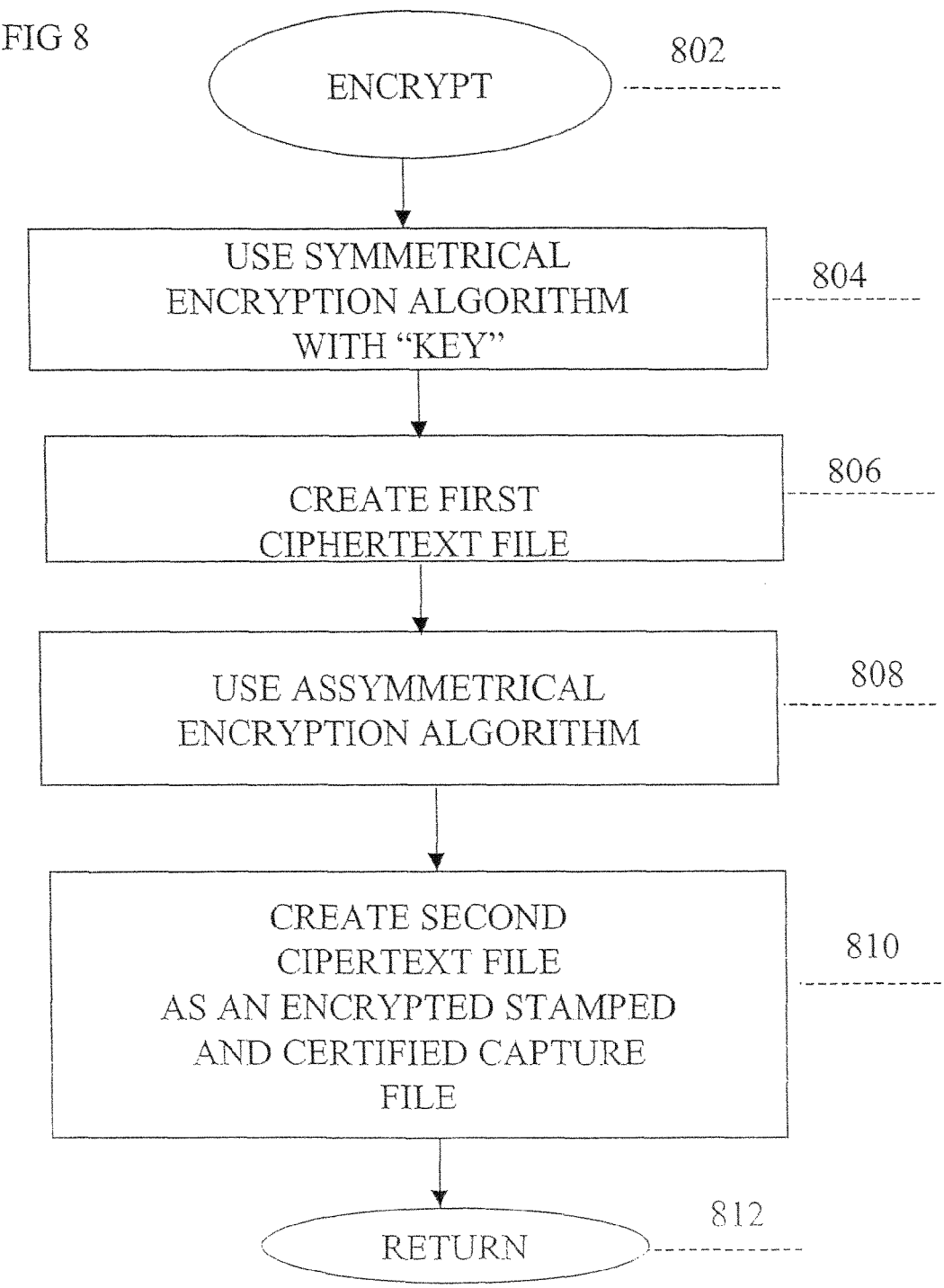

APPARATUS AND METHOD TO EMBED SEARCHABLE INFORMATION INTO A FILE, ENCRYPTION, TRANSMISSION, STORAGE AND RETRIEVAL

CROSS-REFERENCE TO RELATED APPLICATIONS

This application is a continuation of U.S. patent application Ser. No. 13/306,732, filed Nov. 29, 2011, and entitled APPARATUS AND METHOD FOR EMBEDDING SEARCHABLE INFORMATION INTO A FILE, ENCRYPTION, TRANSMISSION, STORAGE AND RETRIEVAL, published as U.S. Patent Application Publication No. US/2012/0071133, which application Ser. No. 13/306,732 is a continuation of U.S. patent application Ser. No. 12/857,731, filed Aug. 17, 2010, and entitled APPARATUS AND METHOD FOR EMBEDDING SEARCHABLE INFORMATION INTO A FILE FOR TRANSMISSION, STORAGE AND RETRIEVAL, published as U.S. Patent Application Publication No. US 2010/0310071, now U.S. Pat. No. 8,068,638, which application Ser. No. 12/857,731 is a continuation of U.S. patent application Ser. No. 11/679,533, filed Feb. 27, 2007, and entitled APPARATUS AND METHOD FOR EMBEDDING SEARCHABLE INFORMATION INTO A FILE FOR TRANSMISSION, STORAGE AND RETRIEVAL, published as U.S. Patent Application Publication No. US 2007/0201721, now U.S. Pat. No. 7,778,440, which application Ser. No. 11/679,533 is a continuation of U.S. patent application Ser. No. 11/325,373, filed Jan. 4, 2006, and entitled APPARATUS FOR CAPTURING INFORMATION AS A FILE AND ENHANCING THE FILE WITH EMBEDDED INFORMATION, published as U.S. Patent Application Publication No. US 2006/0115111, now U.S. Pat. No. 7,184,573, which application Ser. No. 11/325,373 is a continuation of U.S. patent application Ser. No. 10/674,910, filed Sep. 29, 2003, and entitled FORENSIC COMMUNICATION APPARATUS AND METHOD, published as U.S. Patent Application Publication No. US 2004/0125208, now U.S. Pat. No. 6,996,251, which application Ser. No. 10/674,910 claims the benefit of U.S. Provisional Application No. 60/414,449, filed Sep. 30, 2002, and entitled FORENSIC COMMUNICATION APPARATUS AND METHOD.

U.S. Patent Application Publication Nos. US 2012/0071133, US 2010/0310071, US 2007/0201721, US 2006/0115111, US 2004/0125208 and U.S. Pat. Nos. 8,068,638, 7,778,440, 7,184,573, 6,996,251 are incorporated by reference herein.

TECHNICAL FIELD OF THE INVENTION

This invention is related in general to information transmission systems and, more particularly, to an information transmission system that is operable to be stored at a remote location as a secure file in a trusted environment.

BACKGROUND OF THE INVENTION

With the popularity of wireless "digital" computing devices, such as, Personal Digital Assistants (PDA's) cell phones, cameras, video, audio recorders and other digital recorders, users have been afforded the ability to record and transmit digital media within seconds.

With the advent of digital media, it has become increasingly easy to copy, counterfeit, falsify and misuse digital information of all kinds. This includes digital photographs, video & audio recordings of speech or musical performances, motion pictures and recordings of physical phenomena, such as meter readings or "black box" records. This digital media can be altered in ways that defy detection, audio recordings can be compressed and anonymously offered to the public with impunity, and time and date stamps on any of the media just listed can be easily changed with freely available tools.

An attendant problem is that of secure storage. While a flash memory card within these digital recording devices (in any of its currently popular forms) can hold hundreds of pictures, images, video and audio, the problem with securely storing, indexing and retrieving thousands of media files has still not been solved. When the works of intellectual property (music, software, images and movies, to name a few) are much more valuable than the equipment on which they reside, the temptation for theft and alteration becomes great.

Furthermore, this invention provides for the secure non-repudiation by embedding Certificate Authorities non-repudiation Digital Certificates of the digital files for forensic or other evidentiary purposes that are sent and received across the transmission networks.

This works for any kind of media file—photographs, images, music, audio spoken word, video, physical phenomena—anything. Obvious applications range from taking a photograph, video clip to "black boxes" embedded in transportation facilities. Following an incident, information could be transmitted using the above schemes to a storage facility. Only authorized personnel could then retrieve the encrypted messages and return the data to cleartext form.

SUMMARY OF THE INVENTION

The present invention disclosed and claimed herein, in one aspect thereof, comprises an apparatus for acquiring information to be transmitted to a receiving facility and for transmitting such thereto. A capture device captures information from a first source. A stamping device is provided for associating with the captured information the date and time of the capture of the information, such that the date and time information in association with the captured information forms augmented captured information. A data processing unit is provided for placing the augmented captured information in association with subscriber information in a transmission of the augmented captured information to a receiving facility requiring such subscriber information. A transmitter transmits the transmission including the augmented captured information and the subscriber information to the receiving facility. The data processing unit encrypts the augmented captured information with a symmetrical encryption algorithm to provide encrypted augmented captured information in the transmission with the subscriber information.

BRIEF DESCRIPTION OF THE DRAWINGS

For a more complete understanding of the present invention and the advantages thereof, reference is now made to the following description taken in conjunction with the accompanying Drawings in which:

FIG. 8 illustrates a flow chart depicting the encryption algorithm operation.

DETAILED DESCRIPTION OF THE INVENTION

Figure 1:
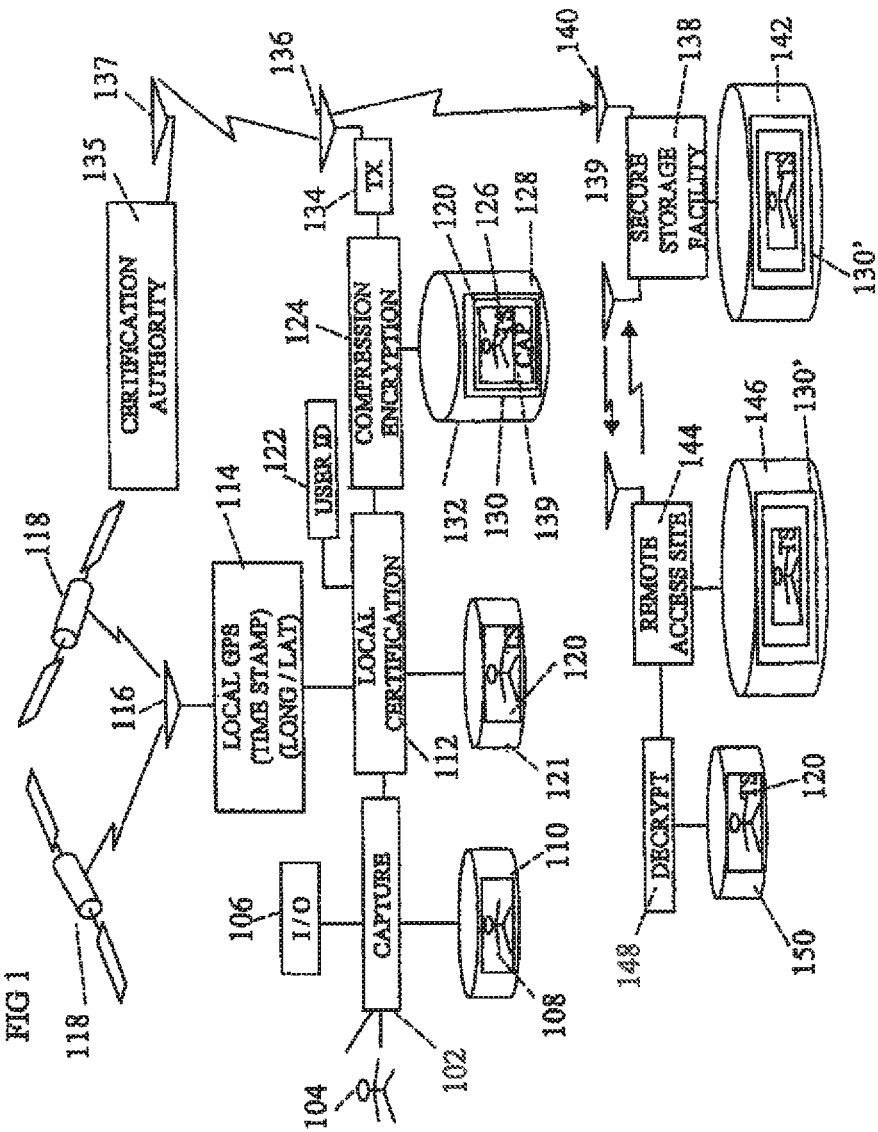
FIG. 1 illustrates a block diagram of the overall operation of the system in accordance with the present disclosure.

Referring now to FIG. 1, there is illustrated a block diagram of the overall operation of the system in accordance with the present disclosure. The system generally is directed toward a capture device 102 that is operable to capture, in this embodiment, an image of an individual; for example, the individual denoted by the reference numeral 104. This can be any type of scene or any type of information that is captured. This could be a video segment, a still picture or an audio segment. It should be understood that the capture device 104 could capture any type of information, not just video information. As will be described herein below, the purpose of the system of the present disclosure will be to not only capture information but to store the information in a secure and certifiable manner such that it is non-repudiable. The capture device is controlled by a user through an input/output (I/O) interface 106. The image 104, in this example, will be captured in the form of a capture file 108 stored in a storage area 110, this being a buffer area. The capture device 102 could be a cell phone that has a video camera associated therewith, any type of device having a digital camera associated therewith, an audio system for capturing an audio file, etc. The phone, in one example, can capture and digitize the image, or even a video segment.

Once the captured image 108 is formed and temporarily stored, it then goes to the next step of the operation. In this step of the operation, a process block 112 is provided to obtain local certification. Local certification, in this example, is some certification that is viewed as providing information in such a manner that there is a high level of confidence in that information which is to be associated with the image as an integral part thereof and will, as described herein below, follow the image. For example, the information that is obtained will be time and date information and longitude and latitude information that is received from a GPS system (global positioning system), a conventional system. The time information, the date information and the longitude and latitude information are provided in such a manner that, when associated with the capture file 108, this provides some current validation that the file was created at that particular time and, at a later time, it could be identified by the fact that it has that information associated therewith. For example, a user could make a log, either printed or electronic of the image captured and, at a later time, by merely knowing what the time and data information was and the longitude and latitude information was, this would provide a higher degree of confidence that the later viewed file and the original captured file was the same and had not been tampered with or had not been reproduced at a later time and location.

In order to provide this verification, the trusted entity is the GPS system, since this is a system that provides a time stamp and a longitude and latitude from the calibrated system. If this is implemented in such a manner that it is an integral part of the capture operation, i.e., it is integrated into the phone, for example, then a high degree of confidence is maintained that this was obtained basically at the time the capture was complete. The GPS system, as noted herein above, is a conventional system that utilizes a GPS receiver 114 that has an antenna 116 that is operable to receive information from a plurality of satellites 118. Typically, there can be anywhere from three to ten or more satellites from which information can be received to obtain an accurate location. Alternate techniques for recovering time, date and position information includes differential and Doppler analysis of very precise timing signals coming from a plurality of cellular/PCS base stations. A third technique for recovering time, date and position information includes retrieving information directly from the Mobility Management (MM) sub layer of the cellular protocol, where the mobile telephone service provider is a party to the transactions. Finally, another technique of retrieving accurate time and date information include use of a network time server.

The result of the local certification is a locally certified captured image 120 which is illustrated with the image and a time stamp, "TS," disposed on the edge thereof, this location by way of example only, as other methods of disposing this information are described herein below. This "TS" indicates that there is some information that is "embedded" into the captured file or captured image that is now part of the file. For example, as will be described in more detail herein below, there is a science of embedding information referred to as "Steganography" that allows information to be embedded in some expression of intellectual property (a photograph, a musical recording, or other expression,) such that (a) the information is hidden from casual observers and (b) the information is not easily altered or destroyed. One such type is a "water mark" that basically is disposed in the background of a document, for example. In images, there are encoding techniques such as "glifs" that can be disposed in the image which is an optical type encoding that appears as a random background to a viewer, but actually contains digitized information. The result is that the document, file image, etc., is indelibly marked with the date, the time and the location, in addition to associating therewith information about the user in the form of a user ID, which is provided in a user ID block 122. The local certification block 112, therefore, is operable to merge the captured file 108, the GPS information as to time stamp and location and the user information into the single document 120. At this point, the document 120 is still a "clear" document such that it can be viewed by any individual. The image 120 is stored in a temporary image buffer 121.

After the document 120 has been created with the local certification, the system then compresses the file using any of a number of well-known methods. In the case of an image, the compression technique may be a lossy algorithm such as JPEG or (in the case of motion pictures) MPEG, or for a data set, the compression technique may be a lossless method such as Lempel-Ziv-Welch.

After compression, the file 120 is processed through an encryption operation wherein the file is first encrypted in accordance with predetermined encryption algorithms, this being performed in a block 124. The encryption, as will be described herein below, is a double encryption operation which wraps the local certified captured file with a first level of encryption 126 and a second level of encryption 128 to provide an encrypted document 130. This is then stored in a temporary storage buffer 132. The file 130 is then subjected to a non-repudiation certification process to acquire a Certificate of Authenticity (CA) from a certification authority 135, this certification authority 135 being a trusted third party that can "digitally sign" a file, image, etc. and provide a level of authenticity to that file. This is conventional technology. The document 130, in its encrypted form, is converted to a "hash"

file and this hash file, which is a representation of the encrypted file, is sent to the certification authority 135 via a transmitter and antenna 136 along a wireless path, and received by an antenna 137 at the certification authority 135 location. Again, this is a wireless operation. The hash file is then signed and a combination hash file and certificate of authenticity is then sent back to the antenna 136 which is then stored in a temporary memory 133 as a certified document. This is illustrated with the attached certification authority certificate 139. This is the file that is sent to the secure storage facility, this being a file 130'.

After encryption, certification by the CA and compression, the encrypted file is then passed to the transmitter 134 for transmission via the antenna 136 along a wireless path to a secure storage facility 138 having a receiving antenna 140 associated therewith. The secure storage facility 138 is a repository. In one embodiment, this repository 138 does nothing more than to store the image 130 in a large database 142 for access at a later time. Additionally, the secure storage facility 138 could be a trusted storage facility, which trusted storage facility has the ability to "unwrap" the encryption from the document 120 such that it can transmit the document 120 at a later time upon request. Alternatively, the secure storage facility 138 could merely be a place to store the information with secure measures as to restricting access to only authorized individuals. In that scenario, the secure storage facility 138 would not be able to decrypt the image 130 and would merely be able to transfer the image to the individual or entity authorized to access that information.

For access, a remote access site 144 is operable to send requests to the secure storage facility 138, identify themselves with the appropriate passwords to comply with the security procedures of the secure storage facility 138 and then have the image requested sent thereto. This image can then be stored in a memory 146 and decrypted with a decryption algorithm in a block 148 for storage of the decrypted file 120 in a storage space 150. This can then be extracted by a user for whatever purpose. In general, all of the encryption ensures that there has been no "tampering" with the file before it is decrypted. Once decrypted, then the time date stamp and location information, in addition to the user information, is still embedded in the picture, document, audio file, etc. that makes up the captured file to show that there was some local indelible certification that verifies the captured file as being authentic and which was embedded at the time of creation.

Figure 2:
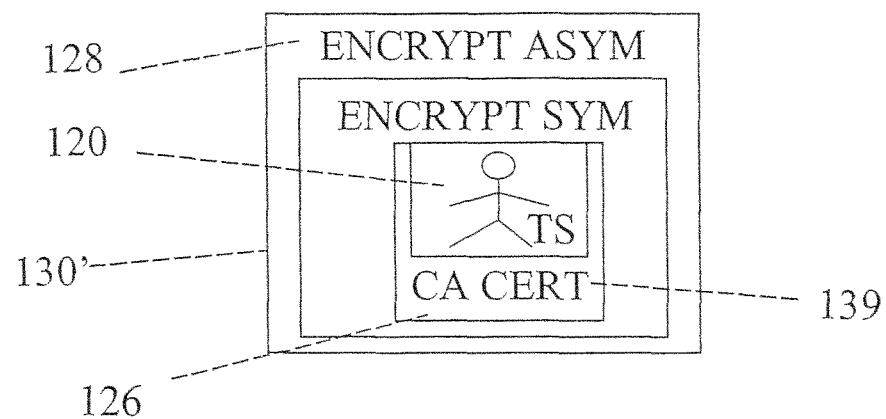
FIG. 2 illustrates a diagrammatic view of the captured and encrypted file.

Referring now to FIG. 2, there is illustrated a diagrammatic view of the captured and encrypted file 130 which, as noted herein above, is comprised of the locally certified captured file 120 wrapped by the first layer of encryption 126 and the second layer of encryption 128. As will be described herein below, the first layer of encryption is a symmetrical encryption algorithm and the second layer 128 is an asymmetrical encryption layer 128. The symmetrical encryption layer is something that can be unwrapped merely by having access to various public keys. This is a fairly conventional PKI system. The second layer of encryption, the asymmetrical encryption layer, is a layer that requires a private key in order to extract this layer. Therefore, in order to gain access to the file at the second layer of encryption, the individual must have the private key to unwrap the first layer and the other key to unwrap the second layer. Again, this will be described in more detail herein below.

Figure 3:
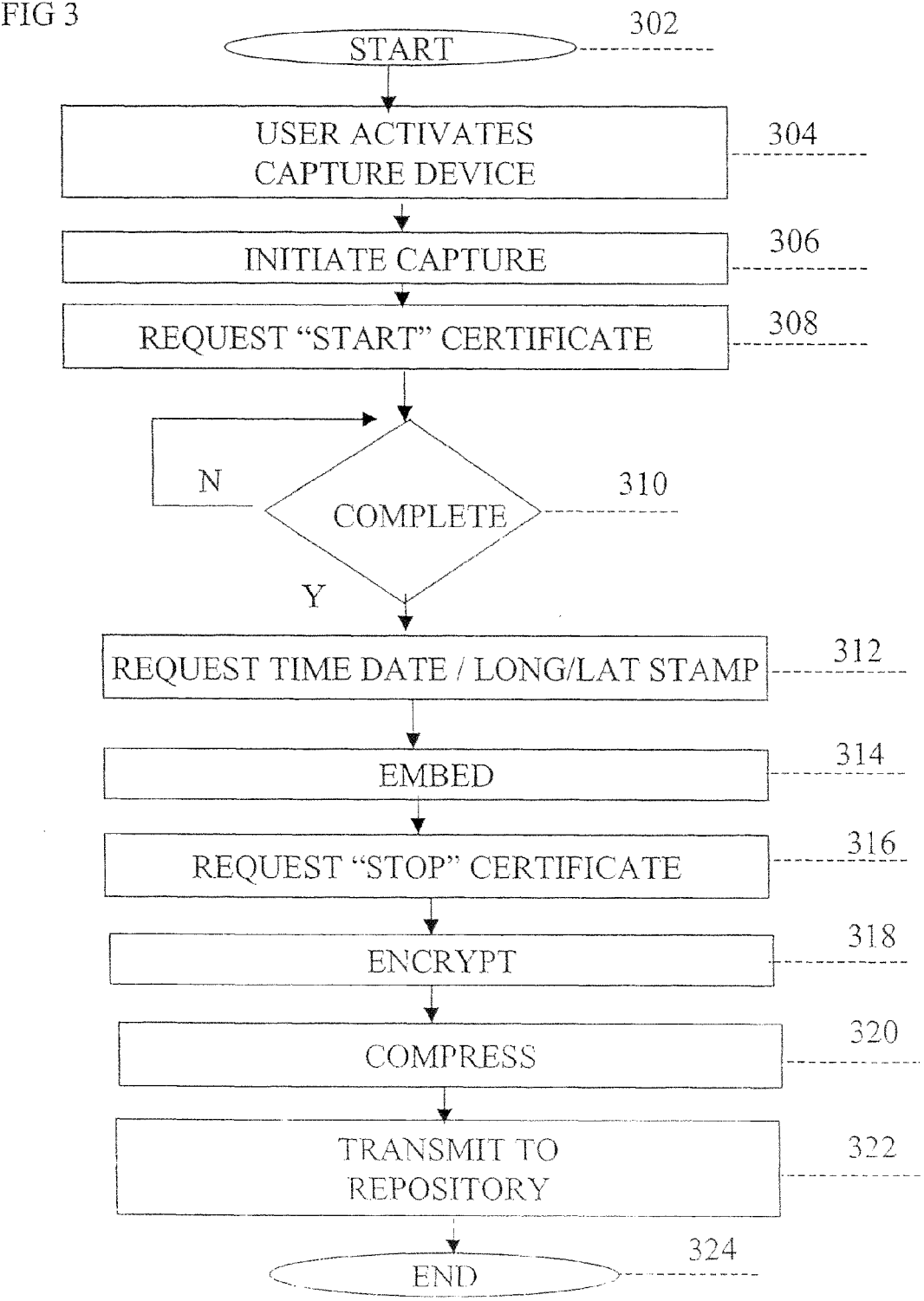
FIG. 3 illustrates a flow chart depicting the overall operation of the capture operation.

Referring now to FIG. 3, there is illustrated a flow chart depicting the overall operation of the capture operation, which is initiated at a start block 302 and then proceeds to a function block 304 in order to allow the user to activate the capture device 102. The user activates the capture device 102 and then a capture operation is initiated at a block 306. Upon initiation of a capture, there is, in one embodiment, a "start" request sent out to the certification authority 135. The certification authority 135 receives the request generated at the block 308 for a certification certificate as to the "start" information that was sent to it. This can merely be the text "start" that is certified. This is sent back to the system during the capture operation. A decision block 310 indicates that this operation which will wait for the receipt of the certificate. However, during the time that this certificate is being generated, the capture is continuing. Once the program, after the start request is generated, then flows to a decision block 310 to wait for the completion of the capture operation. As soon as this is complete, the program flows along a "Y" path to a function block 312 in order to request the time, date, longitude, latitude information and then embed this information along with user information, as indicated by a function block 314. This is embedded into the captured file as described herein above. The program then flows to a function block 316 in order to request a "stop" certificate from the certification authority 135. In this operation, the certificate is requested prior to encryption such that the "clear" file can be certified prior to encryption with the certificate 139. However, the file could be encrypted first and then certified. The program then flows to an encryption block 318 to encrypt the file and then to a function block 320 to compress the file. This compressed file is then transmitted to the repository, as indicated by a function block 322 and then the program proceeds to an End block 324.

Figure 4:
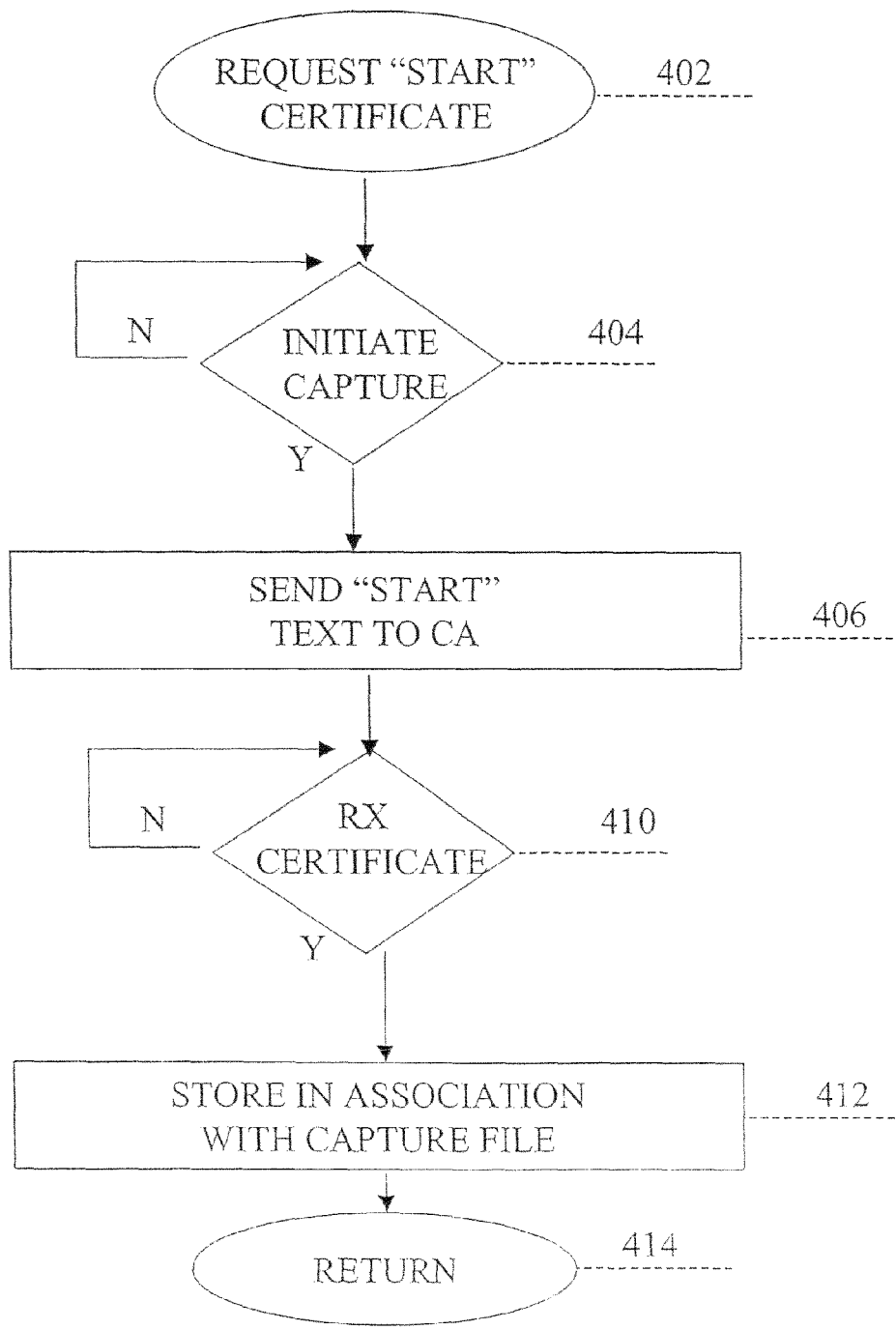
FIG. 4 illustrates a flow chart depicting the operation of the request operation for the start certificate.

Referring now to FIG. 4, there is illustrated a flow chart depicting the operation of the request operation for the start certificate, as initiated at a block 402. The program then proceeds to decision block 404 in order to initiate the capture operation. When the capture operation is initiated, the program flows along a "Y" path to a function block 406 to send the "start" text to the certification authority 135. Of course, this could be a "hash" of a certain initial part of the capture file, but just the text would be sufficient. The program then flows to a decision block 410 to determine if the certificate has been received for this "start" text and, when it has been received, the program will flow along the "Y" path to a function block 412 to store this received certificate in association with the captured file. Of course, this may not be disposed in association therewith until the capture is complete. Additionally, although not illustrated in this flow chart, the start time could also have time and date information as well as longitude and latitude information associated therewith such that there would be local certification of both the start time and the stop time which is received from a trusted authority, i.e., the GPS system. Once this information is determined as stored in association with the captured file, the program flows to a return block 414. Again, this information may merely be stored in a temporary buffer until the capture is complete.

Figure 5:
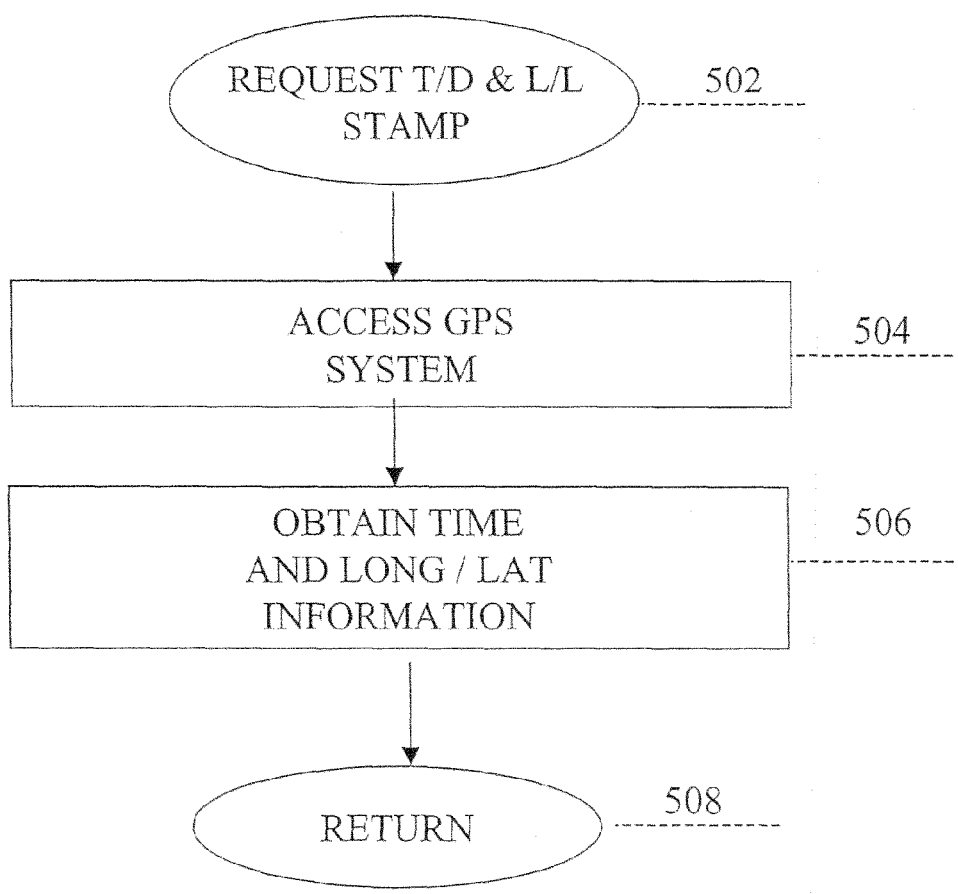
FIG. 5 illustrates a flow chart depicting the operation of requesting information from the GPS.

Referring now to FIG. 5, there is illustrated a flow chart depicting the operation of requesting information from the GPS, which is initiated at a block 502. The program then flows to a function block 504 in order to access the GPS system. This, again, is a conventional operation which will obtain both accurate time information and location information. This access of information is indicated in a function block 506. The program then stores this information and flows back to a Return block 508.

Figure 6:
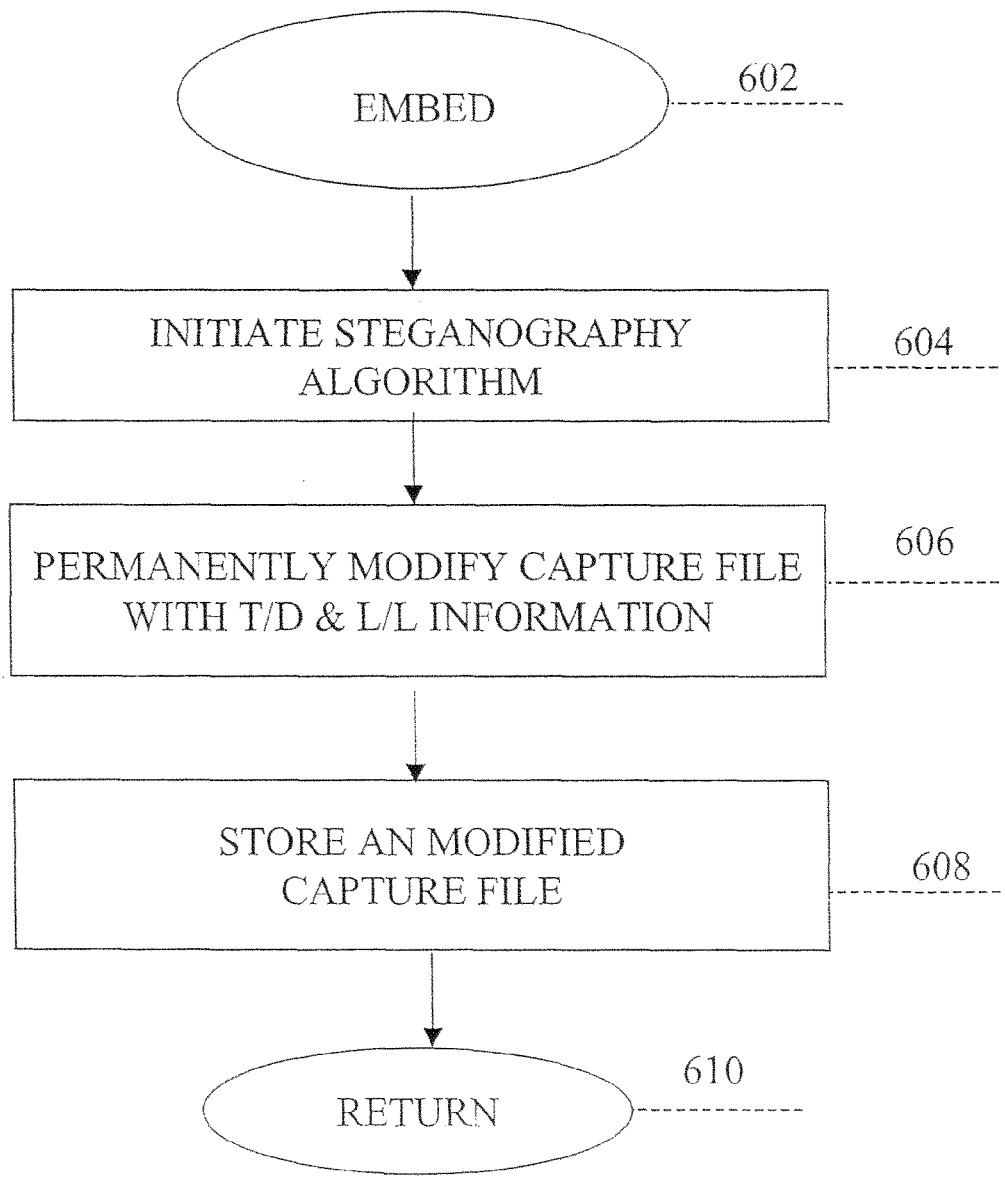
FIG. 6 illustrates a flow chart depicting the operation of embedding information into the captured file.

Referring now to FIG. 6, there is illustrated a flow chart depicting the operation of embedding information into the captured file, which is initiated at a block 602. The program then flows to a function block 604 to initiate a steganography algorithm. The steganography operation is operable to permanently modify the captured file with the time/date information and longitude and latitude information as well as user ID information, this indicated at a function block 606. The program then flows to a function block 608 to store a modified captured file with this local certification information embedded therein. Again, this local certification information provides some level of authenticity to a "clear" file. The program then flows to a Return block 610.

Figure 7:
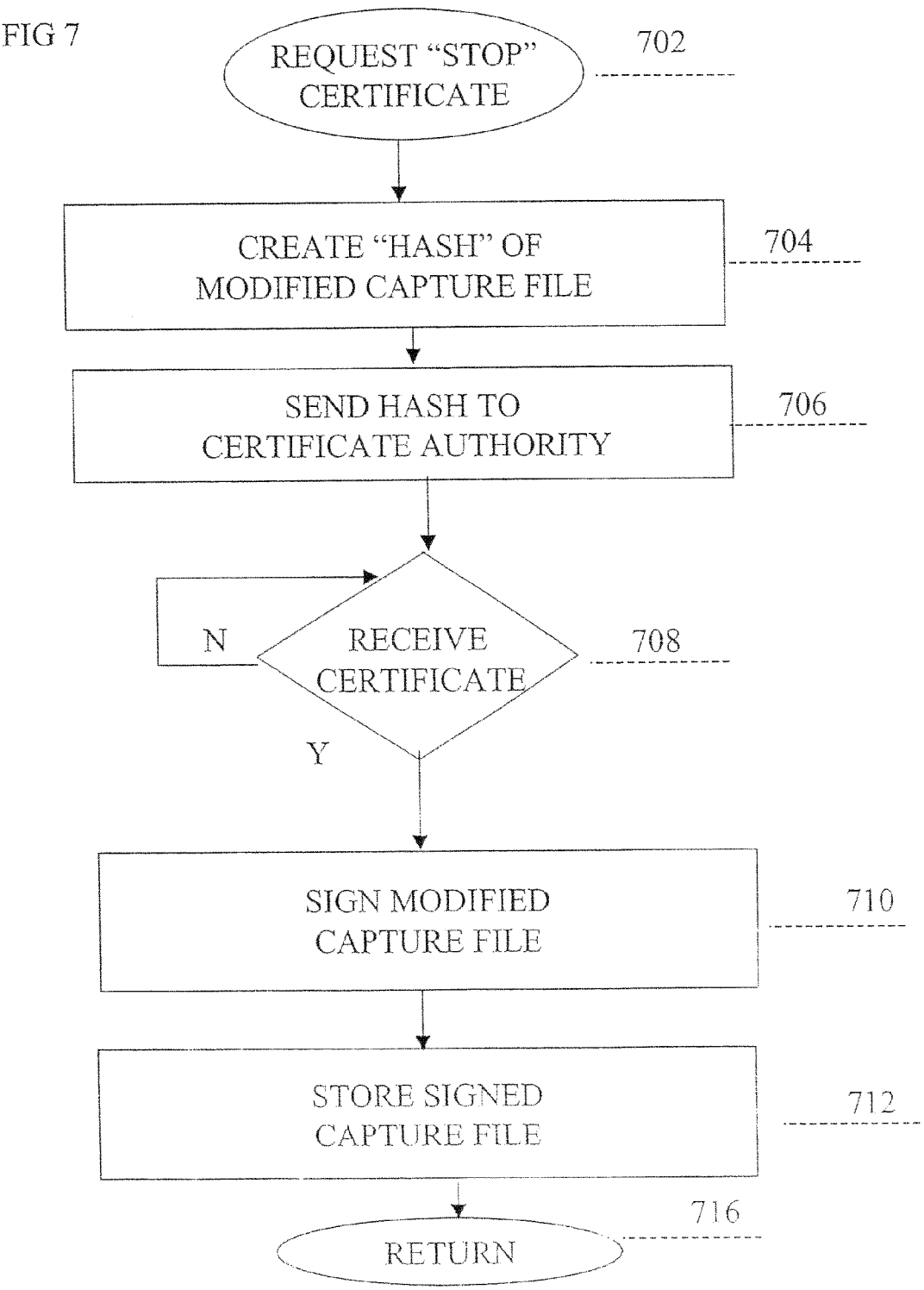
FIG. 7 illustrates a flow chart depicting the operation of requesting the stop certificate.

Referring now to FIG. 7, there is illustrated a function block or a flow chart depicting the operation of requesting the stop certificate, which is initiated at a start block 702 and then proceeds to a function block 704 to create the "hash" file of a modified capture file. This hash file is then sent to the certification authority 135, as indicated by a function block 706. The program then flows to decision block 708 to wait for the receipt of the certificate and, once received, flows to a function block 710 to basically sign the modified capture file and associate with the modified capture file a certificate of authority. Since the hash file is a digital representation of the actual captured file, the actual capture file does not have to be transmitted to the certification authority 135. The reason for this is that one would like to prevent the transmission over any wireless link of "clear" information. As such, the hash file has no discernable information associated therewith and, as such, it only has meaning when associated with the original file from which it was generated, since the algorithm for generating a hash file will clearly identify the two. As such, the certificate generated by the certification authority 135 is sufficient to ensure that a trusted authority has in fact verified the authenticity of the file, this indicated by a function block 712 wherein the captured file is signed and then the program flows to a Return block 716.

Referring now to FIG. 8, there is illustrated a flow chart depicting the encryption algorithm operation, which is initiated at a block 802 and then proceeds to a function block 804. This is the operation wherein symmetrical encryption is utilized with a "public and private key system." The symmetrical encryption is an operation in which a plaintext message is transformed by a well-known algorithm operating under control of a key. The key is a short (less than 1000 bits, usually) data string that instructs the encryption algorithm how to transform the plaintext into an unreadable form called ciphertext. This type of encryption is called "symmetrical" because the same key that is used to encrypt the plaintext is used to decrypt the ciphertext, resulting in a plaintext file once again.

After encryption in the "first layer," the program then flows to function block 806 to create the first ciphertext file. This first ciphertext file is then processed with an asymmetrical encryption algorithm, as indicated by a function block 808 to further encrypt or protect the captured file. The second general type of cryptosystem is asymmetrical encryption. This encryption scheme uses mathematical functions called one-way or trapdoor functions that are easy to perform but extremely difficult to reverse. Examples of these one-way functions are factoring large composite numbers (two large numbers are easy to multiply, but finding the two large numbers given the product alone is difficult) and the discrete logarithm problem (raising a number to a power modulo some value is easy, but finding the number given the result is difficult). In an asymmetrical cryptosystem, one key (referred to as the public key) is used to encrypt the plaintext and a second, related key (called the private key) is used to decrypt the ciphertext. In a public-key encryption scheme, it is common to publish the public key. In this way, anyone can send a secure message, but only the holder of the private key can decrypt the message and reveal the plaintext.

Asymmetrical cryptosystems have another use as well: by encrypting a file under his or her private key, a party can prove that he or she is the author of the message. If others can decrypt the file using the associated public key, then nobody but the holder of the private key could have created the message. This leads to properties favorable to the present invention: proof of ownership and non-repudiation. The result of the asymmetrical encryption step will be the creation of the second ciphertext file as an encrypted stamped and certified captured file, as indicated by function block 810. The program then proceeds to a Return block 812.

To illustrate how the system of the present disclosure operates, one example of an application of the capture device 102—a wireless digital camera—will be described.

The user takes a picture, video, audio, or acquires any other data set, or any combination of these. The apparatus then sends a request to a certificate authority to obtain a certification of the time and date of the recording. This certificate, as well as time, date and location information obtained from the GPS receiver or other techniques for determining this information, as well as an identifying number unique to the wireless digital video camera, is steganographically encoded onto the image and/or audio files.

The image is now marked, but it is still "in the clear." That is, anyone who gains access to the image file will be able to reproduce the image. It must now be secured so that unauthorized parties cannot view the image.

After compression, the next step is to encrypt the file in such a way that the file cannot be used without access to a secret key.

Once the image file has been indelibly marked and compressed, and it is about to be encrypted using a symmetrical cryptosystem, a decision must be made as to what key to use. There are several methods of establishing a key. The first is to have a single, fixed key assigned to the wireless digital recorder (i.e. camera) at the factory. The problem with this method is that if this key becomes compromised, then all images taken by the wireless digital recorder (i.e. camera) are compromised. A second method is to create a new, random key each time a photograph is taken, and store the table of keys in the wireless digital recorder (i.e. camera) for subsequent download. This, although feasible, may be undesirable for the same reason that storing the images themselves in the wireless digital recorder (i.e. camera) is undesirable: memory in the wireless digital recorder (i.e. camera) is fragile, and if the keys are lost, the images are useless.

Instead, a preferred method of key management is used. In this scheme, the serial number of the wireless digital recorder (i.e. camera) and other pertinent information that can be recovered without recovering the file (like the filename, the time and date, etc.) are securely hashed. Hashing refers to a practice of creating a short dataset that represents a larger dataset. For example, if one were to assign all the letters in a document a number (A=1, B=2, etc.), add those numbers together modulo 26, one would come up with a single number between 0 and 25. If any letter in the document changed, the result of the function would change as well, and thus could be used as an indication that the document had changed. In a way, the short dataset (the modulo sum) would stand in for the larger dataset (the document). Note that the short dataset cannot be used to reproduce the document, but that changing the document in a way that doesn't affect the modulo sum is difficult.

Hashing works in just this way, but with much larger numbers. In the disclosed system, the serial number is hashed with other information to create a key. If the key is compromised (by technical or legal means) then no other photograph taken by the wireless digital recorder (i.e. camera) is compromised. It is impossible—not just difficult—to go from the hashed key to the source material, in the same way it is impossible to deduce this document from one modulo sum character.

Now the file is encrypted, and only the holder of the secret key can unlock the file. Two more steps remain before the file is transmitted to the secure storage facility. First, the entire encrypted file is passed through a message authentication algorithm, which produces a hash (similar to the way the symmetrical encryption key was calculated, above) over the whole file. In this way, if any byte of the message file is corrupted in transmission, it will be discovered. The file is then encrypted using an asymmetrical cryptosystem under the user's private key, effectively signing the file.

Finally, identifying information is added to the (now doubly) encrypted file, and the file is encrypted again—this time, under the storage facility's public key. Now, observe the properties of the file thus created:

- The file is secure. Nobody but the storage facility can open the outer wrapper.
- The file is anonymous to casual observers. There is no identifying information outside of the outer wrapper.
- The file is signed. The storage facility can open the outer wrapper and discover an identifier of the party who claims to have created the file.
- The signature is irrefutable and cannot be repudiated. The storage facility can look up the public key of the party claiming to be the author of the file, and can attempt to open the middle wrapper. Inside, they will find an encrypted file and a hash of the file. If the calculated hash matches the given hash, then the photograph without question belongs to that party.
- Even after two wrappers have been removed, the picture is still secret. The storage facility keeps only encrypted files. They have no means of removing the final wrapper.

Should it become necessary to prove the authenticity of the photograph, the storage facility 138 can testify to all the above facts. Additionally, the originator of the photograph is the only one who can unlock the inner wrapper and produce the photograph. Finally, the photograph itself is steganographically marked, and this final information is clinching proof that the provenance of the photograph is accurate.

To return to the example wherein the picture is ready for transmission at this point, the wireless digital recorder (i.e. camera) attempts to connect to the server at the secure storage facility 138 or other recipients who have access the network (i.e. PDA's, other wireless digital devices) using any of a number of well-known wireless methods. Among these are data channels associated with IS-95 CDMA, IS-136 TDMA, CDPD, GSM as well as purely data paths such as 802.11b. The exact mechanism of data transmission is not germane.

However the data is transmitted, the storage facility 138 receives the triply-encrypted data file and performs the following steps:

- Remove the outer wrapper and extract an encrypted file and plain-text subscriber identification.
- Look up the subscriber information and recover his/her public key.
- Remove the middle wrapper using the public key to reveal an encrypted file and a hash value.
- Pass the encrypted file through a message digest algorithm to produce a computed hash.
- If the computed hash does not match the received hash, send a negative acknowledge and discard the file; otherwise . . . .
- Calculate a message digest of (1) the received hash, (2) the time and date, and (3) a random number.
- Return an affirmative acknowledgment and a certificate containing the message digest calculated in (6), above.
- Store the encrypted photograph along with the received time and date and the random number produced in (6). In this way, if the certificate is ever challenged, the storage facility will be able to verify that it sent the certificate.

The user can also transmit these files over various networks to other recipients (PDA's, cell camera phones, "IP Addresses, E-mail to name a few) for their review and storage. However the users' unique identity and other certificates described in this document are embedded within the file(s).

The wireless digital recorder (i.e. camera), upon receipt of the certificate, transmits an acknowledgment and removes the photograph from its temporary store. The certificate can be stored or discarded—it is not required to retrieve the photograph. If stored, it becomes further evidence of the provenance of the photograph.

Image retrieval from the storage facility 138 is simple. At login, the storage facility presents a random string encrypted under the user's public key. The user must decrypt the string and re-encrypt it under the storage facility's public key. Only the holder of the secret key can do this and it proves beyond doubt to the storage facility that they are communicating with the owner of the photograph.

Once identity is established, the user can download any file from the storage facility. Once downloaded, the user can open the final wrapper and extract the image.

Again, this works for any kind of media file—photographs, images, music, audio spoken word, video, physical phenomena—anything. An obvious application would be in "black boxes" embedded in transportation facilities. Following an accident, information could be transmitted using the above schemes to a storage facility. Only authorized personnel could then retrieve the encrypted messages and return the data to cleartext form.

Some of the features provided by the system of the present disclosure are as follow:

- An apparatus for the purpose of recording image or other data in real time; indelibly marking the data with the date, time, location and information identifying the creator of the data; transmitting the data in real time to a storage facility; and receiving and verifying acknowledgment of the receipt of the data from the storage facility. The apparatus consists of an image-recording device or other data recording device, a geographical position and time-of-day determination device, a data processing unit and a communication device.
- Additionally the image-recording device is a digital camera.
- Additionally the image-recording device is a video camera.
- Additionally where the digital image capture device is an image scanner.
- Additionally the digital image capture device is a facsimile machine.
- Additionally the data-recording device is a digital voice recorder.
- Additionally the data-recording device is a real-time data acquisition system.
- Additionally the geographical position and time-of-day determination device is a GPS receiver.
- Additionally the data processing unit is a microcontroller.
- Additionally the data processing unit is a field-programmable gate array.
- Additionally the data processing unit is an application-specific integrated circuit.
- Additionally the communication device is a cellular telephone chipset.

A method is also provided of recording images, sounds or other data and indelibly marking the images, sounds, or other data with the date, time, location, authentication certificate, and information identifying the creator of the data.

The method further includes the step in which the authentication certificate is obtained by polling a certificate authority by means of the communication device.

The method further includes the step in which the method of indelibly marking images is steganography.

The method further includes the step in which the method of indelibly marking sounds is watermarking.

Another method is provided of encrypting images and other data such that unauthorized parties cannot render the images and other data in usable form; the images and other data cannot be repudiated by the creator; and that date, time, location and creator metadata can be verified by third parties.

The method further includes the step in which the image or other data is first compressed using a well-known compression algorithm, producing a compressed image or other data.

The method further includes the step in which the compression algorithm is the Lempel-Ziv-Welch algorithm.

The method further includes the step in which the compression algorithm is the JPEG algorithm.

The method further includes the step in which the compression algorithm is the MPEG algorithm.

The method further includes the step in which the compressed image or other data is encrypted under a symmetrical, single-key cryptosystem.

The method further includes the step in which the cryptosystem is DES.

The method further includes the step in which the cryptosystem is IDEA.

The method further includes the step in which the cryptosystem is Triple-DES.

The method further includes the step in which the cryptosystem is AES.

The method further includes the step in which the image or other data, having been encrypted under the symmetrical cryptosystem, is then applied to a message digest algorithm.

The method further includes the step in which the output data of the message digest algorithm are then appended to the symmetrically encrypted data.

The method further includes the step in which the message digest algorithm is the Secure Hash Algorithm.

The method further includes the step in which the image or other data, having been symmetrically encrypted and having a message digest appended is then further encrypted using an asymmetrical (public-key) algorithm.

The method further includes the step in which the image or other data is encrypted using the creator's private key.

The method further includes the step in which the asymmetrical algorithm is the RSA algorithm.

The method further includes the step in which the image or other data, having been encrypted under the symmetrical algorithm and the asymmetrical algorithm, is then augmented with personal identifying information belonging to the creator of the data.

The method further includes the step in which the personal identifying information is a serial number.

The method further includes the step in which the image or other data, having been encrypted and with said personal identifying information appended is then further encrypted using a public-key encryption algorithm.

A storage facility operation is also provided for the purpose of receiving and storing images, audio and other data from a multiplicity of information sources.

The method further includes the step in which the encryption is performed under the public key belonging to the storage facility.

The method further includes the step in which the public-key encryption algorithm is the RSA algorithm.

The method further includes the step in which the image or other data encrypted according to the method of above under the public key belonging to the storage facility is then transmitted to the storage facility using a transmission medium.

The method further includes the step in which the transmission medium is cellular digital packet data.

The method further includes the step in which the transmission medium is a CDMA data channel.

The method further includes the step wherein the storage facility verifies the origin of information received that has been transmitted according to the above methods.

The method further includes the step in which the information received is decrypted under the private key belonging to the storage facility.

The method further includes the step in which the decrypted information consists of an encrypted data set and identifying information.

The method further includes the step in which the identifying information is used as an index into a database that contains the public encryption keys of all parties authorized to store information in the storage facility.

The method further includes the step in which the identifying information is used to locate a unique public key contained in the data base of and belonging to the purported originator of the data.

The method further includes the step in which the key obtained by the above methods is used to decrypt the encrypted data set of, creating a decrypted data set.

The method further includes the step in which the decrypted data set consists of a symmetrically encrypted data set and a received message digest.

The method further includes the step in which the symmetrically encrypted data set is presented to a message digest algorithm to produce a computed message digest.

The method further includes the step in which the received message digest is compared to the computed message digest.

The method further includes the step in which verification of the message is determined to be successful if the received message digest and the computed message digest are identical.

The method further includes the step of transmitting an acknowledgment of receipt to the originator of the image or other data.

The method further includes the step in which the acknowledgment of receipt consists of the received message digest encrypted under the private key of the storage facility and the public key of the originator.

The method further includes the step in which the certificate authority is a public certificate authority.

The method further includes the step in which the certificate authority is a private certificate authority.

The method further includes the step in which the certificate authority is a government agency.

The method further includes the step in which the time, date and location information is obtained from the GPS receiver.

The method further includes the step in which the time, date and location information is derived from signaling obtained from the cellular telephone chipset.

The method further includes the step in which the time, date and location information is derived directly from information contained in the MM layer of the mobile telephone service provider.

The method further includes the step in which the time and date information is derived from a network time server.

The method further includes the step where the secure server or image data repository is Data Base server.

The method further includes the step where the secure server or image data repository is Web server.

The method further includes the step where the secure server or image data repository is e-mail server.

The method further includes the step where the secure server or image data repository is FTP server The method further includes the step for securely retrieving data stored at the storage facility.

The method further includes the step in which the method is a challenge-response mechanism.

The method further includes the step in which the request includes the identity of the requestor and the identity of the data set to be retrieved.

The method further includes the step in which the storage facility creates a random bit stream as a challenge.

The method further includes the step in which the storage facility determines the public key of the requestor by means of looking up the public key in the database.

The method further includes the step in which the storage facility encrypts the random bit stream with the public key belonging to the requestor.

The method further includes the step in which the storage facility transmits the encrypted random bit stream to the requestor.

The method further includes the step in which the requestor decrypts the random bit stream using the private key corresponding to the public key under which the bit stream was encrypted.

The method further includes the step in which the recovered random bit stream is then re-encrypted in the public key belonging to the storage facility.

The method further includes the step in which the re-encrypted random bit stream is transmitted back to the storage facility.

The method further includes the step in which the storage facility then decrypts the random bit stream using its private key.

The method further includes the step in which the storage facility determines whether the requestor is authentic by comparing the random bit stream recovered from the response of the requestor and the random bit stream.

The method further includes the step in which the storage facility transmits the requested data set only if the random bit streams match.

The method further includes the step in which the method is biometric.

The method further includes the step in which the storage facility sends a zero knowledge challenge to the requestor.

The method further includes the step in which the requestor performs a biometric measurement to determine the response to the zero-knowledge challenge.

The method further includes the step in which the requestor returns the requested data set only if some number of challenges is answered correctly.

The method further includes the step in which the method is by means of a password or passphrase.

The method further includes the step in which the method is by means of an electronic key or other electronic identification device.

With the disclosed system, this provides for a method of storing, cataloging, viewing, playback and printing of images, video, audio and photographs change as well. Instead of relying on photo finishers, anyone with an inexpensive printer can reproduce images, anyone with a CD reader/writer can reproduce audio, and anyone with a DVD player/recorder can reproduce both images and audio.

Additionally, instead of a fireproof safe, image, video, audio and photograph storage involves digital media. And, instead of couriers and the mail, transmitting images, video, audio and photographs from one place to another is likely to involve the Internet.

This new world of opportunities has its problems as well. Once images, video, audio and photographs are in the digital domain, there are opportunities to modify these so that it no longer represents the events that actually occurred. Digital cameras or other digital recorders at the time of this submission, typically include a clock of dubious accuracy that can, in any event, be set back or forward to make it seem as though an event occurred at a time other than the actual time of the event. And the metadata—the time, date, and location of the images, video, audio and photographs—is not stored using any secure method. Anyone knowledgeable in the field can modify the metadata to make the images, video, audio and photographs appear that it was taken at a time and place other than the real time and place.

Another problem solved with the system of the present disclosure is that of storage. For many users (photographers, musicians, forensic, video/audio personnel, governmental, military personnel, public service, professional and non professional personnel and others) the value of the images, video, audio and photographs taken far exceeds the value of the equipment used to take them. For these users, it is important that the images, video, audio and photographs themselves be transported to a secure location at the earliest possible opportunity. Digital recording devices (i.e. digital cameras and other digital recording devices) rely on memory cards that contain non-volatile solid-state memory that, while robust for a solid-state device, is easily damaged by mechanical shock or static electricity. Unlike film, in which a defect may only cause a minor blemish in the image, a single defect in the memory card of a digital recording device may be enough to render all the information on the card useless.

It is noted that the images, video, audio and photographs not be disclosed to an unauthorized third party. While traditional analog film images, video and audio recordings can be physically locked into a secure facility, digital images, audio, and video reside on computers. These computers can be the subjects of network attacks and information on them can be compromised in two ways. First, a knowledgeable opponent can read information from an internet-connected computer— that is, an opponent can view images, video, audio and photographs he or she is unauthorized to view. Second, a knowledgeable opponent can obtain write permission and modify the images, video, audio and photographs in a way that is difficult to detect.

Finally, the user is provided the ability to attach, mix, and modify media files easily and indelibly mark each image, video, audio, photograph or media file as his or her own work, to eliminate the possibility of plagiarism and to provide a certificate authority while wirelessly transmitting said media files for secure storage or to another recipient or source.

In the days of film cameras (analog), security usually meant placing the negatives into a photo safe. Prints made from the negatives could be marked with an identifier that clearly indicated the pedigree of the photograph. Those who would use the photograph without permission of the owner would be subject to a copyright infringement suit—and it would be sufficient evidence in court for the user to produce the negatives and testifies that, in fact, he or she took the photographs.

With the advent of digital media and the proliferation of the Internet, images, video, audio, photographs and other forms of digital documents stored on digital computers are no longer secure.

This invention addresses all of these concerns. It provides a mechanism for recording, attaching, mixing, appending to, modifying images, video, audio and photographs, marking the images, video, audio and photographs indelibly with a provable time, date, location and identity of the individual taking the images, video, audio and photographs. It then provides a means to transport the images, video, audio and photographs to a secure, off-site storage facility and to obtain positive confirmation that the transmission occurred error-free. It provides a method for securely rendering the image, video, and audio and photograph useless to anyone but the original user. Finally, it provides the ability to demonstrate, with legal certainty, that the image, video, audio and photograph was taken at the location and at the time indicated, and that the image or audio file has not been altered, as well as, tracks ongoing changes made by the originator or other user identities within the original file.

Although the preferred embodiment has been described in detail, it should be understood that various changes, substitutions and alterations can be made therein without departing from the spirit and scope of the invention as defined by the appended claims.

What is claimed is:

1. A cell phone for acquiring information from a first source to be transmitted to a receiving facility and for transmitting such thereto, comprising:
   a capture device for being initiated by a user of the cell phone for capturing the information;
   a stamping device for associating with the captured information a representation of the date and time of the capture of the information proximate in time to the capture, such that said representation of the date and time information in association with the captured information forms augmented captured information;
   a data processing unit for placing the augmented captured information in association with subscriber information in a transmission of the augmented captured information to a receiving facility requiring such subscriber information; and
   a transmitter for transmitting said transmission including the augmented captured information and the subscriber information to said receiving facility;
   wherein the data processing unit encrypts the augmented captured information with a first encryption algorithm in a first layer to provide encrypted augmented captured information which is included in the transmission with the subscriber information transmitted by the transmitter in said transmission.

2. The cell phone of claim 1, and wherein the data processing unit further encrypts the first layer encrypted augmented captured information with a second layer of encryption utilizing a second encryption algorithm to provide the encrypted augmented information.

3. The cell phone of claim 2, wherein the second encryption algorithm is an asymmetrical encryption algorithm that utilizes a public key for encryption and a private key is required for decryption.

4. The cell phone of claim 3, wherein the data processing system adds identifying information to the first and second layer encrypted augmented information wherein the identifying information identifies the party claiming to have created the augmented captured information and then further encrypts the first and second layer encrypted augmented information with the added identifying information with a third layer of encryption with an asymmetrical encryption algorithm to provide the encrypted augmented information.

5. The cell phone of claim 4, wherein the third layer asymmetrical encryption algorithm utilizes a public key of a third party.

6. The cell phone of claim 4, wherein the identifying information comprises the subscriber information.

7. The cell phone of claim 6, wherein the data processing system creates a hash corresponding to augmented captured information and storing this hash value in association with the first layer encrypted augmented information prior to encryption with the second layer encryption operation such that decryption down to the first layer encrypted augmented information will allow recovery of the added hash value and processing of the first layer encrypted augmented information through a message digest algorithm will allow matching of the recovered and generated hash values.

8. A cell phone for acquiring information from a first source to be transmitted to a receiving facility and for transmitting such thereto, comprising:
   a capture device for capturing the information;
   a stamping device for associating with the captured information a representation of the date and time of the capture of the information proximate in time to such capture, such that said representation of the date and time information in association with the captured information forms augmented captured information;
   a data processing unit for placing the augmented captured information in association with subscriber information in a transmission of the augmented captured information to a receiving facility requiring such subscriber information; and
   a transmitter for transmitting said transmission including the augmented captured information and the subscriber information to said receiving facility;
   wherein the receiving facility comprises a secure server.

9. The cell phone of claim 8, wherein the secure server comprises an e-mail server.

10. A cell phone for acquiring information from a first source to be transmitted to a receiving facility and for transmitting such thereto, comprising:
    a capture device for capturing the information;
    a stamping device for associating with the captured information a representation of the date and time of the capture of the information proximate in time to such capture, such that said representation of the date and time information in association with the captured information forms augmented captured information;
    a data processing unit for placing the augmented captured information in association with subscriber information in a transmission of the augmented captured information to a receiving facility requiring such subscriber information; and a transmitter for transmitting said transmission including the augmented captured information and the subscriber information to said receiving facility;

wherein the transmitter transmits the transmission to a receiving facility that restricts access thereto to only authorized individuals.

11. A cell phone for acquiring information from a first medium to be transmitted to a receiving facility and for transmitting such thereto, comprising:

a capture device for capturing the information from the first medium where information varies in real time and converting it to time invariant information in a second media;

a stamping device for associating with the captured information a representation of the date and time of the capture of the information proximate in time to such capture, such that said representation of the date and time information in association with the captured information forms augmented captured information;

a data processing unit, the data processing unit:
encrypting the augmented captured information as encrypted augmented captured information,
adding identifying information to the encrypted augmented captured information to provide an identifiable encrypted file, wherein the identifying information identifies the party claiming to have created the augmented captured information for later identification of such,
placing the identifiable encrypted file including the augmented captured information in association with subscriber information in a transmission of the identifiable encrypted file including the identifiable encrypted file that includes the augmented captured information to a receiving facility requiring such subscriber information; and a transmitter for transmitting said transmission including the identifiable encrypted file and the subscriber information to said receiving facility.

12. The cell phone of claim 11, wherein the stamping device is operable to associate the captured information with a representation of location information representing the location of said capture device at the time of the capture of the information as augmented capture information.

13. The cell phone of claim 11, wherein said stamping device includes a geographical position and time-of-day determination (GPS) receiver for providing such location information.

14. The cell phone of claim 11, wherein the receiving facility is an email server.

15. The cell phone of claim 14, wherein the transmission is formatted for transmission to the email server.

16. The cell phone of claim 11, wherein the data processing unit encrypts the augmented captured information with a symmetrical encryption algorithm in a first layer to provide the encrypted augmented captured information which is included in the transmission with the subscriber information transmitted by the transmitter in said transmission.

17. The cell phone of claim 16, and wherein the data processing unit further encrypts the first layer encrypted augmented captured information with a second layer of encryption utilizing an asymmetrical encryption algorithm to provide a two layer encrypted file, which has the identifiable information added thereto to provide the identifiable encrypted file.

18. The cell phone of claim 17, wherein the asymmetrical encryption algorithm utilizes a public key for encryption and a private key is required for decryption.

19. The cell phone of claim 17, wherein the data processing system further encrypts identifiable encrypted file including the first and second layer encrypted augmented information with the added identifying information with a third layer of encryption with an asymmetrical encryption algorithm to provide a three layer encrypted file for transmission in said transmission with the subscriber information.

20. The cell phone of claim 19, wherein the third layer asymmetrical encryption algorithm utilizes a public key of a third party.

21. The cell phone of claim 19, wherein the identifying information comprises the subscriber information.

22. A cell phone for acquiring information from a first medium to be transmitted to a receiving facility and for transmitting such thereto, comprising:

a capture device for capturing the information from the first medium where information varies in real time and converting it to time invariant information in a second media;

a stamping device for associating with the captured information a representation of the date and time of the capture of the information proximate in time to such capture, such that said representation of the date and time information in association with the captured information forms augmented captured information;

a data processing unit, the data processing unit:
encrypting the augmented captured information with a bottom layer of encryption as an encrypted file that provides a first level of encryption of the augmented captured information,
adding identifying information to the encrypted augmented captured information at the bottom layer, wherein the identifying information identifies the party claiming to have created the augmented captured information for later identification of such,
encrypting the combined augmented captured information and identifying information with a top layer of encryption as an identifiable encrypted file wherein at least the bottom layer utilizes a symmetrical encryption algorithm,
placing the identifiable encrypted file including the augmented captured information in association with subscriber information in a transmission of the identifiable encrypted file including the identifiable encrypted file that includes the augmented captured information to a receiving facility requiring such subscriber information; and a transmitter for transmitting said transmission including the identifiable encrypted file and the subscriber information to said receiving facility.

23. The cell phone of claim 22, wherein the receiving facility is an email server.

24. The cell phone of claim 23, wherein the transmission is formatted for transmission to the email server.

25. The cell phone of claim 22, and wherein the data processing unit further encrypts the bottom layer encrypted augmented captured information with a middle layer of encryption utilizing an asymmetrical encryption algorithm to provide a two layer encrypted file, which has the identifiable information added thereto to provide the identifiable encrypted file.

26. The cell phone of claim 25, wherein the asymmetrical encryption algorithm utilizes a public key for encryption and a private key is required for decryption.

27. The cell phone of claim 25, wherein top layer of encryption utilizes an asymmetrical encryption algorithm to provide a three layer encrypted file for transmission in said transmission with the subscriber information.

28. The cell phone of claim 27, wherein the top layer asymmetrical encryption algorithm utilizes a public key of a third party.

29. The cell phone of claim 27, wherein the identifying information comprises the subscriber information.

30. A cell phone for acquiring information from a first medium to be transmitted to a receiving facility and for transmitting such thereto, comprising:
- a capture device for capturing the information from the first medium where information varies in real time and converting it to time invariant information in a second media;
- a stamping device for associating with the captured information a representation of the date and time of the capture of the information proximate in time to such capture, such that said representation of the date and time information in association with the captured information forms augmented captured information;
- a data processing unit, the data processing unit:
  - encrypting the augmented captured information with a bottom layer of encryption as an encrypted file that provides a first level of encryption of the augmented captured information utilizing a symmetrical encryption algorithm,
  - encrypting the bottom layer encrypted augmented captured information with a middle layer of encryption utilizing an asymmetrical encryption algorithm to provide a two layer encrypted file,
  - adding identifying information to the two layer encrypted file, wherein the identifying information identifies the party claiming to have created the augmented captured information for later identification of such,
  - encrypting the combined two layer encrypted file and identifying information with a top layer of encryption to provide an identifiable encrypted file,
  - placing the identifiable encrypted file including the encrypted augmented captured information in association with subscriber information in a transmission of the identifiable encrypted file including the identifiable encrypted file that includes the encrypted augmented captured information to an email requiring such subscriber information and wherein the identifying information comprises the subscriber information; and
- a transmitter for transmitting said transmission including the identifiable encrypted file and the subscriber information to said email server.

31. A cell phone for acquiring information from a first medium to be transmitted to a receiving facility and for transmitting such thereto, comprising:
- a capture device for capturing the information from the first medium where information varies in real time and converting it to time invariant information in a second media;
- a stamping device for associating with the captured information a representation of the date and time of the capture of the information in addition to location information of the capture device proximate in time to the capture of the information, such that said representation of the date and time information and location information in association with the captured information forms augmented captured information;
- a data processing unit, the data processing unit:
  - encrypting the augmented captured information as encrypted augmented captured information,
  - adding identifying information to the encrypted augmented captured information to provide an identifiable encrypted file, wherein the identifying information identifies the party claiming to have created the augmented captured information for later identification of such,
  - placing the identifiable encrypted file including the augmented captured information in association with subscriber information in a transmission of the identifiable encrypted file including the identifiable encrypted file that includes the augmented captured information to an email server requiring such subscriber information, wherein the indentifying information comprises the subscriber information; and
- a transmitter for transmitting said transmission including the identifiable encrypted file and the subscriber information to said email server.

* * * * *